United States Patent
Chen et al.

(10) Patent No.: US 11,303,681 B2
(45) Date of Patent: Apr. 12, 2022

(54) SYSTEM AND METHOD FOR NETWORK-BASED TRANSFERRING COMMUNICATION SESSIONS BETWEEN ENDPOINTS

(71) Applicant: BCE INC., Verdun (CA)

(72) Inventors: Vincent Y. X. Chen, Mississauga (CA); Victor Arrieta, Laval (CA)

(73) Assignee: BCE Inc., Verdun (CA)

( * ) Notice: Subject to any disclaimer, the term of this patent is extended or adjusted under 35 U.S.C. 154(b) by 0 days.

(21) Appl. No.: 16/722,432

(22) Filed: Dec. 20, 2019

(65) Prior Publication Data

US 2020/0204598 A1   Jun. 25, 2020

Related U.S. Application Data

(60) Provisional application No. 62/783,978, filed on Dec. 21, 2018.

(51) Int. Cl.
*H04L 29/06* (2006.01)
*H04L 65/1083* (2022.01)
*H04L 67/306* (2022.01)

(52) U.S. Cl.
CPC ........ *H04L 65/1083* (2013.01); *H04L 67/306* (2013.01)

(58) Field of Classification Search
CPC ............... H04L 65/1083; H04L 67/306; H04L 29/08639; H04L 29/08576
See application file for complete search history.

(56) References Cited

U.S. PATENT DOCUMENTS

| | | | | |
|---|---|---|---|---|
| 7,788,357 B2* | 8/2010 | Riley | .................... | H04L 47/822 709/223 |
| 10,237,803 B2* | 3/2019 | Yeoum | ................ | H04L 65/1073 |
| 10,567,212 B2* | 2/2020 | Mouquet | ............ | H04L 65/1006 |
| 2009/0210536 A1* | 8/2009 | Allen | ................ | H04L 29/08639 709/227 |
| 2011/0238845 A1* | 9/2011 | Keller | ................ | H04L 65/1016 709/227 |
| 2014/0173125 A1* | 6/2014 | Selvanandan | ......... | H04W 12/06 709/229 |
| 2014/0237123 A1* | 8/2014 | Dave | ....................... | H04M 3/42 709/227 |
| 2015/0245398 A1* | 8/2015 | Cserna | .................. | H04W 76/14 455/41.1 |
| 2015/0349971 A1* | 12/2015 | Sinha | .................. | H04L 63/0428 370/260 |
| 2016/0057139 A1* | 2/2016 | McDonough | ........... | H04L 67/02 726/6 |
| 2016/0112464 A1* | 4/2016 | Nyshadham | ........ | H04L 65/1069 709/227 |
| 2017/0094575 A1* | 3/2017 | Bercovici | ............. | H04W 36/14 |
| 2020/0204598 A1* | 6/2020 | Chen | ................... | H04L 65/1046 |

\* cited by examiner

Primary Examiner — Jerry B Dennison

(57) ABSTRACT

A system and method is described that allows a communication session to be transferred between endpoints. A user may provide an indication using a first endpoint of the communication session that they desire to transfer the communication session to a second endpoint. Communication session endpoints associated with the user that are available to transfer the communication session can be determined and the user may select one of the available endpoints and then the communication session can be transferred from the first endpoint to the selected endpoint.

14 Claims, 14 Drawing Sheets

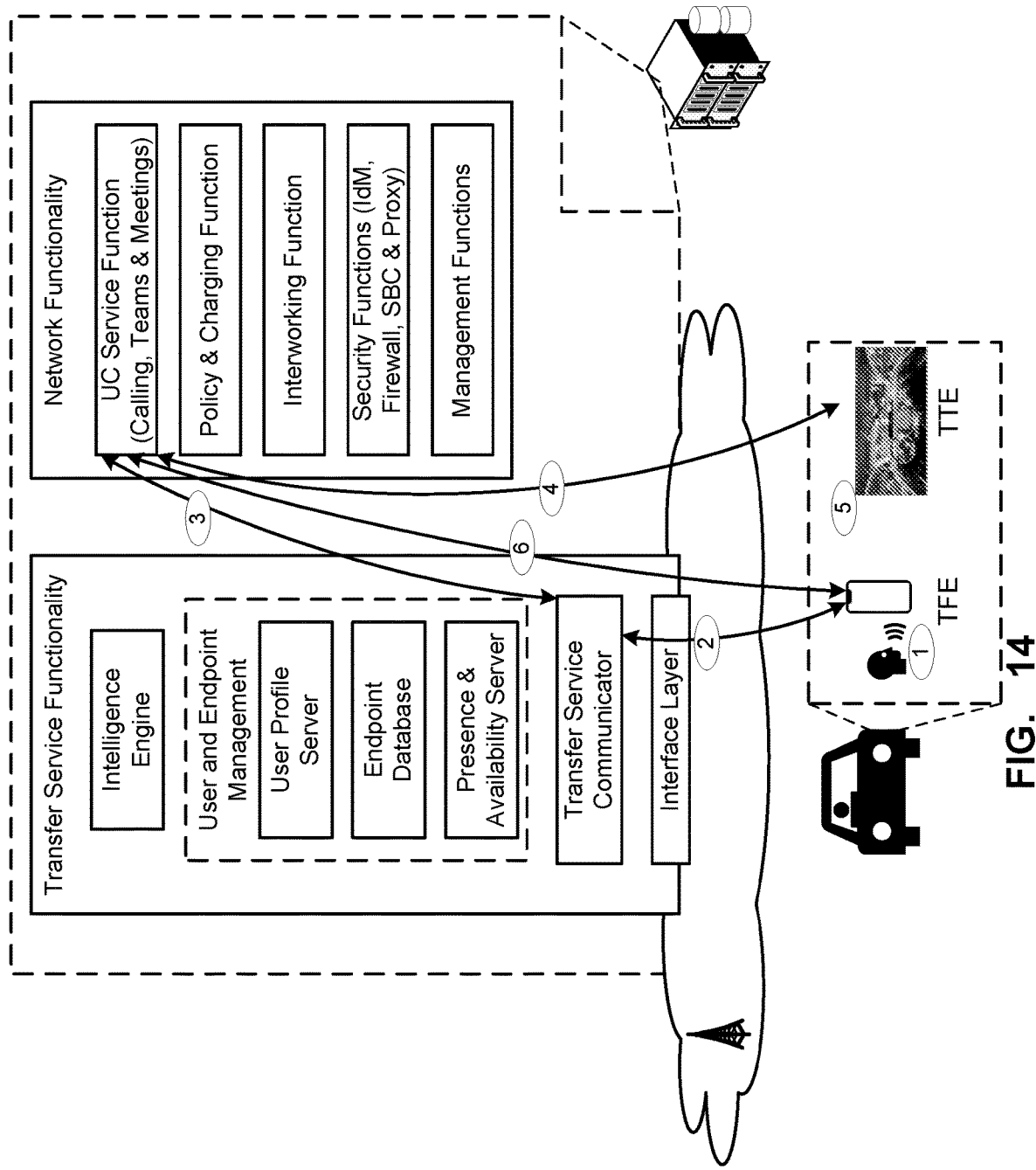

SYSTEM AND METHOD FOR NETWORK-BASED TRANSFERRING COMMUNICATION SESSIONS BETWEEN ENDPOINTS

RELATED APPLICATIONS

This application claims priority to U.S. Provisional Patent Application No. 62/783,978, filed Dec. 21, 2018, the contents of which are incorporated by reference herein in their entirety for all purposes.

TECHNICAL FIELD

The current disclosure relates to network-based communication sessions and in particular to transferring a communication session from one end point to a second end point.

BACKGROUND

Communication sessions can be established between two endpoints over a network. For example, two employees located in different locations may establish a live multimedia collaboration communication session between their respective computers. The communication session may include one or more of, for example, audio, video, screen sharing, instant messaging, data or other types of communication.

There are many challenges that prevent a user from being able to seamlessly transfer a live multimedia session from one endpoint to another endpoint. These challenges hinder a consistent user experience as the user moves, for example, from home, to office, and on the go, when using unified communications services. Techniques for transferring voice calls from one end point to another are not well suited for handling multimedia communication sessions. Techniques that are suited for transferring multimedia sessions rely on ultrasound for detecting proximity of endpoints to enable call/session transfer between a mobile device and a fixed endpoint. Such techniques rely on vendor specific devices.

It is desirable to have additional or alternative techniques for transferring communication sessions between user end points.

BRIEF DESCRIPTION OF THE DRAWINGS

Features, aspects and advantages of the present disclosure will become better understood with regard to the following description and accompanying drawings in which:

FIG. 14 depicts a further example process of transferring a communication session between endpoints.

DETAILED DESCRIPTION

Figure 1:
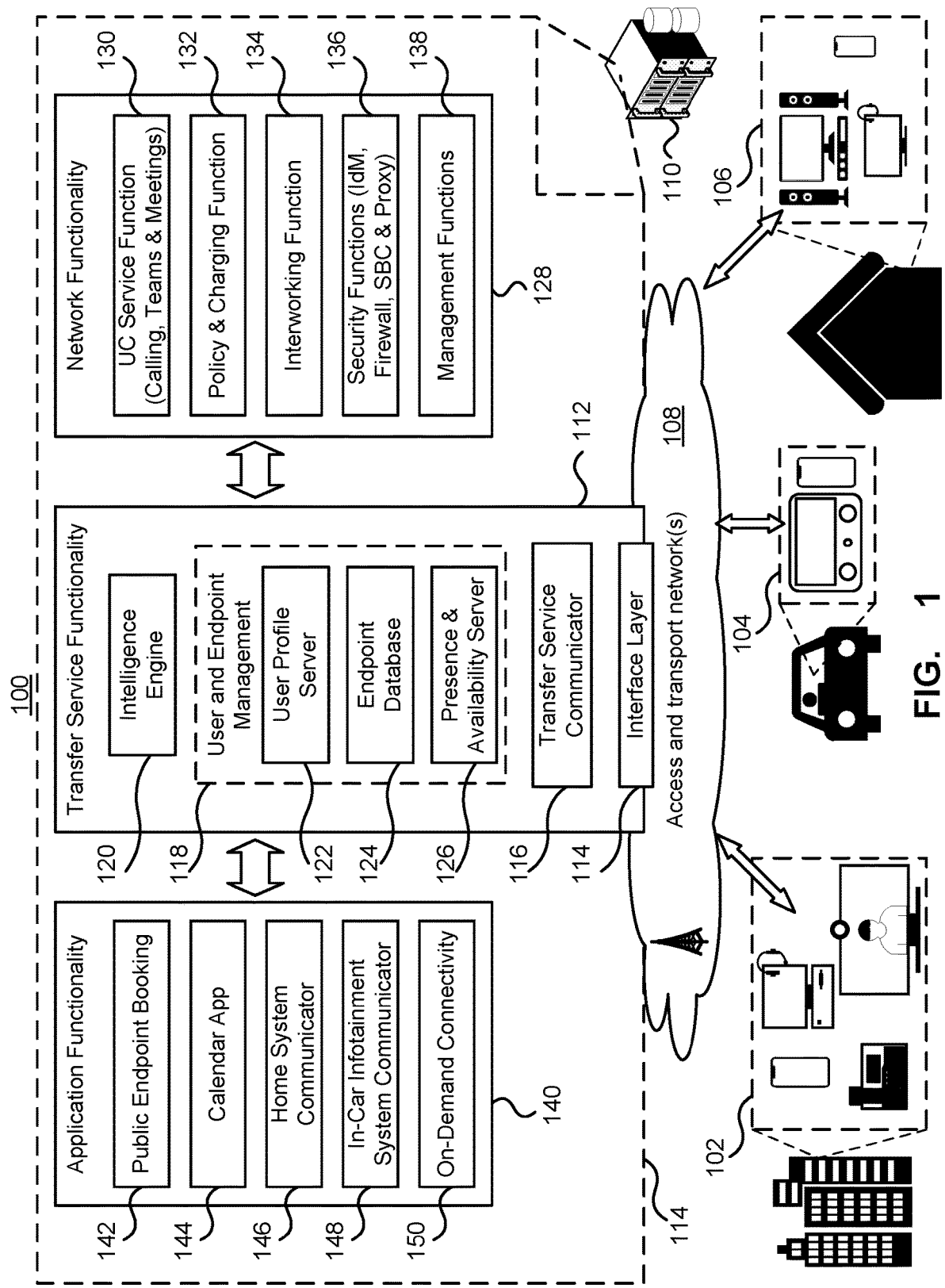
FIG. 1 depicts components of a system for transferring communication sessions between endpoints.

In accordance with the present disclosure there is provided a method for transferring a communication session between endpoints, the method comprising: establishing a communication session between a first user endpoint associated with a user and one or more communication session endpoints; receiving an indication of a desire to transfer the communication session from the first user endpoint; determining a second user endpoint that is available to transfer the communication session to from the first user endpoint; and transferring the communication session from the first user endpoint to the second user endpoint.

In a further embodiment of the method, determining the second user endpoint comprises: determining a plurality of second user endpoints that are available; and selecting one of the plurality of second user endpoints as the second user endpoint to transfer the communication session to.

In a further embodiment of the method, determining the plurality of second user endpoints comprises: determining available user endpoints at a location from a database of endpoints; and determining if the available user endpoints are available for use.

In a further embodiment of the method, selecting one of the plurality of second user endpoints comprises automatically selecting one of the plurality of second user endpoints based on user preferences.

In a further embodiment of the method, selecting one of the plurality of second user endpoints comprises: ordering the available user endpoints according to characteristics of the available user endpoints and user preferences; presenting the ordered available user endpoints; and receiving the selection of one of the presented available user endpoints.

In a further embodiment of the method, the indication of the desire to transfer the communication session from the first user endpoint comprises an indication of a desired location of the second user endpoint.

In a further embodiment of the method, the indication of the desire to transfer the communication session from the first user endpoint comprises an indication of a desired time for transferring the communication session from the first user endpoint to the second user endpoint.

In a further embodiment, the method further comprises booking the second user endpoint at the desired location and desired time.

In a further embodiment of the method, the communication session with the first user endpoint and the communication session with the second user endpoint each comprise session components comprising one or more of: video; audio; instant messaging; screen sharing; and file sharing.

In a further embodiment of the method, the communication session with the first user endpoint and the communication session with the second user endpoint comprise different session components from each other.

In accordance with the present disclosure there is provided a system for transferring a communication session between endpoints, the system comprising: a processor for executing instructions; and a memory storing instructions, which when executed configure the system to: establish a communication session between a first user endpoint associated with a user and one or more communication session endpoints; receive an indication of a desire to transfer the communication session from the first user endpoint; determine a second user endpoint that is available to transfer the communication session to from the first user endpoint; and transfer the communication session from the first user endpoint to the second user endpoint.

In a further embodiment of the system, determining the second user endpoint comprises: determining a plurality of second user endpoints that are available; and selecting one of the plurality of second user endpoints as the second user endpoint to transfer the communication session to.

In a further embodiment of the system, determining the plurality of second user endpoints comprises: determining available user endpoints at a location from a database of endpoints; and determining if the available user endpoints are available for use.

In a further embodiment of the system, selecting one of the plurality of second user endpoints comprises automatically selecting one of the plurality of second user endpoints based on user preferences.

In a further embodiment of the system, selecting one of the plurality of second user endpoints comprises: ordering the available user endpoints according to characteristics of the available user endpoints and user preferences; presenting the ordered available user endpoints; and receiving the selection of one of the presented available user endpoints.

In a further embodiment of the system, the indication of the desire to transfer the communication session from the first user endpoint comprises an indication of a desired location of the second user endpoint.

In a further embodiment of the system, the indication of the desire to transfer the communication session from the first user endpoint comprises an indication of a desired time for transferring the communication session from the first user endpoint to the second user endpoint.

In a further embodiment of the system, the instructions when executed further configure the system to book the second user endpoint at the desired location and desired time.

In a further embodiment of the system, the communication session with the first user endpoint and the communication session with the second user endpoint each comprise session components comprising one or more of: video; audio; instant messaging; screen sharing; and file sharing.

In a further embodiment of the system, the communication session with the first user endpoint and the communication session with the second user endpoint comprise different session components from each other.

A system and method is described that allows a live communication session to be seamlessly transferred between endpoints. The system and method uses network-based functionality to enable the transfers and as such the endpoints may be generic endpoints of any vendor rather than requiring vendor specific technologies for enabling the transfers. The communication session can be transferred to the endpoints regardless of where the endpoints are located, such as at home, in an office or on the go. The communication session transfer can be supported by the network, which can include information about the user and the user's supporting environment.

The current disclosure describes a network-enabled intelligent system that enables a user to transfer a live multi-party multimedia collaboration session, or any form of on-going communication session, from one endpoint to another endpoint, through simple actions such as voice commands to a smart virtual assistant, clicks, screen touches, or button pushes, as the user moves between locations such as at home, in office and on the go. The endpoints may include various computing devices that support one or more types of communication sessions, such as VoIP phones, smart phones, tablets, laptop computers, desktop computers, televisions, set-top boxes or receivers, vehicle entertainment systems, etc. Further, a user may use a single endpoint or multiple endpoints simultaneously in a communication session. For example, a television may act as a display for presenting a shared computer screen, while a user's phone simultaneously provides a voice session. As will be appreciated, each of the endpoints will have an ability to support certain aspects of a communication session. For example, a VoIP phone may only support a voice session, while a desktop computer may support a voice session, video session, instant messaging, and screen sharing. As described in further details below, the session transfer system can establish/transfer appropriate communication sessions between endpoints based at least in part on the capabilities of the endpoint devices.

This system comprises a set of functional entities and network-based intelligent capabilities. Leveraging on these functions and capabilities, the system may have knowledge of the user and the user's supporting environment, and is able to follow the user, and allow the user to transfer live sessions between available endpoint devices. The described system may be deployed on premises or in a network cloud environment, as a stand-alone system or integrated with unified communications (UC) systems or mobility systems, to provide a session transfer service by a service provider, either as an add-on service, or bundled with unified communications services. The endpoints can be mobile devices such as smartphones, tablets, or fixed devices such as desktop and laptop computers, video endpoints, connected screens, windows or windshields incorporating displays, or any other connected endpoints for communication. The communication session can include a two-party or multi-party voice call, video call, text chat, a multi-party multimedia collaboration session including for example audio, video, web, augmented reality, or any other application.

FIG. 1 depicts a system for transferring communication sessions between end points. The system 100 includes a number of user endpoint devices 102, 104, 106 that can each be used as an endpoint for a communication session. As depicted, the endpoint devices may be located in various locations, broadly grouped as in an office of the user, at the user's home or while the user is on the go. The endpoint devices may each have different capabilities for establishing communication sessions and provide different user experiences. For example, a user's desktop computer at work may be able to support a wide range of communication sessions including voice sessions, video sessions, screen sharing and instant messaging, while a user's telephone at home may only support voice sessions. The endpoint devices 102, 104, 106 connect to access and transport network(s) 108. One or more servers 110 are also coupled to the access and transport network(s) 108. These servers 110 provide transfer service functionality 112, as well as other possible functionality, to the endpoint devices 102, 104, 106. The endpoint devices may communicate with the transfer service functionality 112 through interface functionality 114 that provides an interface between the transfer service functionality and an access and transport network 108 of a service provider. Broadly, the access and transport network 108 provides network access to endpoint devices and may include various infrastructure including cellular or wireless infrastructure, internet service infrastructure etc. The transfer service function 112 as well as the access and transport network 108 may be part of a service provider's network infrastructure, which may include for example the one or more servers 110. The transfer service functionality 112 provides various capabilities to execute the session transfer. The transfer service functionality 112 contains various capabilities, for example, transfer service communicator (TSC) functionality 116 and user and endpoint management functionality 118 and an intelligence engine functionality 120. The user and endpoint management functionality 118 manages information about users and endpoints. The user and endpoint management functionality 118 may include, for example, user profile functionality (UP) 122, endpoint database (EDB) 124 and a presence and availability server (PAS) 124.

The TSC functionality 116 provides various functions including communicating with endpoints involved in the communication session transfer. The endpoints may be referred to as a Transfer-From-Endpoint (TFE) and a Transfer-To-Endpoint (TTE). The TSC 116 may also select an appropriate communication protocol (e.g. SIP, Web/HTTP, a Smart Virtual Assistant (SVA) API based on the user and endpoint profiles for the transfer. For example, the user profile, which can be determined from the user profile server 122, may indicate that the user only uses free endpoint devices, while the endpoint profiles, which can be determined from the endpoint database, may indicate that one endpoint supports both SIP and Web/HTTP protocols, but requires a subscription to use, while a second endpoint only supports SIP but is free to use. Regardless of the particular protocol selected, the transfer communication protocol may be a request/response protocol used to coordinate the transfer of the communication session from one endpoint to another. In an IP Multimedia Subsystem (IMS) environment, this communication could be proxied through the P-CSCF (Proxy-Call Session Control Function). Additionally or alternatively, the TSC functionality could be integrated into the P-CSCF. If the TTE device is in another service provider's domain, and assuming there is a reciprocal agreement between the service providers, the communication session may go through the interworking functionality.

The TSC functionality 116 may also communicate with other components within TSF 112. The TSC functionality 116 may communicate with the EDB 124 to select and possibly book a TTE endpoint. The selection of the TTE endpoint may be based on a user request received from the TFE, endpoint availability determined from the presence and availability server (PAS) and user preferences determined from the User Profile (UP). For example, when a TFE device requests endpoints in a particular location at a time, which may be the current time and location of the TFE device or a future time and location of the TFE device, the TSC functionality 116 may determine what endpoints are located in the location and are available for use at the particular time. Certain endpoints may be considered as private endpoints, such as those owned by the user or other 3rd parties that limit access to the endpoints according to some requirement such as a subscription or payment, or public endpoints that are available to use by the public at large. Once the endpoints in the location are determined, their availability at the particular time may be determined by the PAS functionality 126, which may maintain information on the availability of different endpoints at different times.

The TSC functionality 116 may also communicate with the Intelligent Engine (IE) functionality 120 to engage a smart virtual assistant (SVA) service for performing actions and responses. If the TFE supports the SVA functionality, the IE functionality 120 and the SVA functionality may be used to perform various actions such as initiating the session transfer, booking or reserving endpoints, changing communication session characteristics, etc. An endpoint device may interact with the SVA through voice commands, a graphical user interface, or other user interface. The SVA service may use an intelligence service core (ISC) that provides various skills, algorithms, use cases and applications developed by the service provider and by 3rd-party ecosystem partners. For example, a 3rd party messaging system could provide skills to the SVA for sending and receiving messages or performing other actions within the 3rd party messaging system. The skills, algorithms, application, etc. can leverage advancements in artificial intelligence, machine learning, big data analytics, and other advanced intelligence technologies to provide an improved user experience.

The EDB 124 may store information on all of the endpoints that are available for transfer services, including those being directly controlled by the service provider and those of other service providers that the service provider has access to, for example through a reciprocal interconnect and interworking agreement with the other service providers. The endpoints may be wireline connected (including IP & TDM connected), or wirelessly connected (e.g. 4G/5G, including IoT connected, WiFi) devices. The end points may include for example one or more of a hard client, soft client, PC-laptop/desktop, IP phone, TDM phone, tablet, smartphone, video endpoint, conference board, smart window, smart windshield, in-vehicle entertainment system, and other forms of communication endpoints. The endpoints may be private and assigned to or associated with a particular user, and are not available for other users to use. The endpoints may also be public and available for any user to book and use, such as video endpoints in a corporate conference room, endpoints in public meeting rooms, IoT-connected smart windows at an airport lounge. When transferring a live communication session from one endpoint to another, the endpoint that the live session will be transferred from may be referred to as the Transfer From Endpoint (TFE) while the endpoint the session is being transferred to may be referred to as the Transfer To Endpoint (TTE).

Each endpoint in the EDB may have a unique ID and is associated with an indication of the endpoint type, for example as private or public, the endpoint's capability, for example multimedia collaboration, video only, audio only, etc. and possibly protocols or formats supported by the endpoint, location of the end point which may be defined explicitly such as by using geo co-ordinates or addresses or in other ways such as by descriptions like "Maple Leaf Boardroom", and other possibly relevant information for the transfer service such as vendor, model number, serial number, firmware number, supported audio/video codecs, protocols supported, MAC address, IP address connectivity requirements, etc. The information stored by the EDB may include both basic endpoint information needed for transferring a communication session as well as information that may be useful for a user to select an endpoint such as the size of the device, privacy of the location, quality of experience from previous users, etc.

Intelligence engine (IE) functionality 120 is able to interact and interwork with many network assets, both within and outside the service provider network, to support the endpoint transfer service. The intelligence engine functionality can interpret voice and text commands, for example received from SVA functionality on a user's endpoint device, into a set of actionable tasks, with each task being supported by an application within the service provider domain or through an ecosystem. The intelligence engine functionality 120 may have information about the user which may be obtained through self-learning, such as time the user is typically at home, travelling to work, at work, communication preferences, etc. The IE functionality 120 can store the user knowledge in User Profile server 122. Additionally, the intelligence engine functionality may determine information about the user's supporting environment in the form of capabilities, status and availability of all the candidate TTE endpoints that the user may potentially transfer a live session to, and may store and dynamically update the user's endpoint information in the endpoint database (EDB) 124. The intelligence engine functionality is capable of presenting TTE candidates to the user in batches and ranking endpoints in each batch by the probability that best meets the user's needs and gives the user the best experience. The ranking may be based on various factors, including for example based on user's demand and preference, endpoint proximity, private or public, capability, cost, etc. Additionally, the intelligence engine functionality may decide the most appropriate way to communicate with the user about actions and results. For example, if the user is on a phone call, the system may communicate via text. If the user is not currently using audio, the system may communicate to the user with audio. Additionally, the system may allow the user to re-join, or establish, session using other interfaces such as screen touch, button push/click, etc.

The session transfer system may include smart virtual assistant functionality for providing a user interface to perform tasks such as initiating transfers, selecting and reserving endpoints for the transfer. The smart virtual assistant functionality provides speech recognition, voice-to-text and text-to-voice conversion and may be located on the user's endpoint device. Additionally, the SVA functionality may be split between being provided on the user's endpoint as well as within the service provider network.

The session transfer system may leverage network assets to provide convenient transferring of communication sessions between end points. The system may centralize computing power and intelligence, pushing the complexity to the network and allowing reuse of existing endpoints as is, or through simple software/firmware upgrades.

The service provider's network infrastructure 108 may also include additional functionality including various network functionality 128 that provides services such as unified communication service functionality 130, policy and charging functionality 132, interworking functionality 134, security functionality 136 such as identity management, firewalls, proxies, session border controllers, etc., and management functionality 138. In addition to the network functionality 128, the network infrastructure 108 may also provide various application functionality 140. The application functionality may be provided by the service provider or by 3rd parties and may include functionality such as public endpoint booking functionality 142, calendar application functionality 144, home system communicator functionality 146, in-car infotainment system communicator functionality 148 and on-demand connectivity functionality 150.

Figure 2:
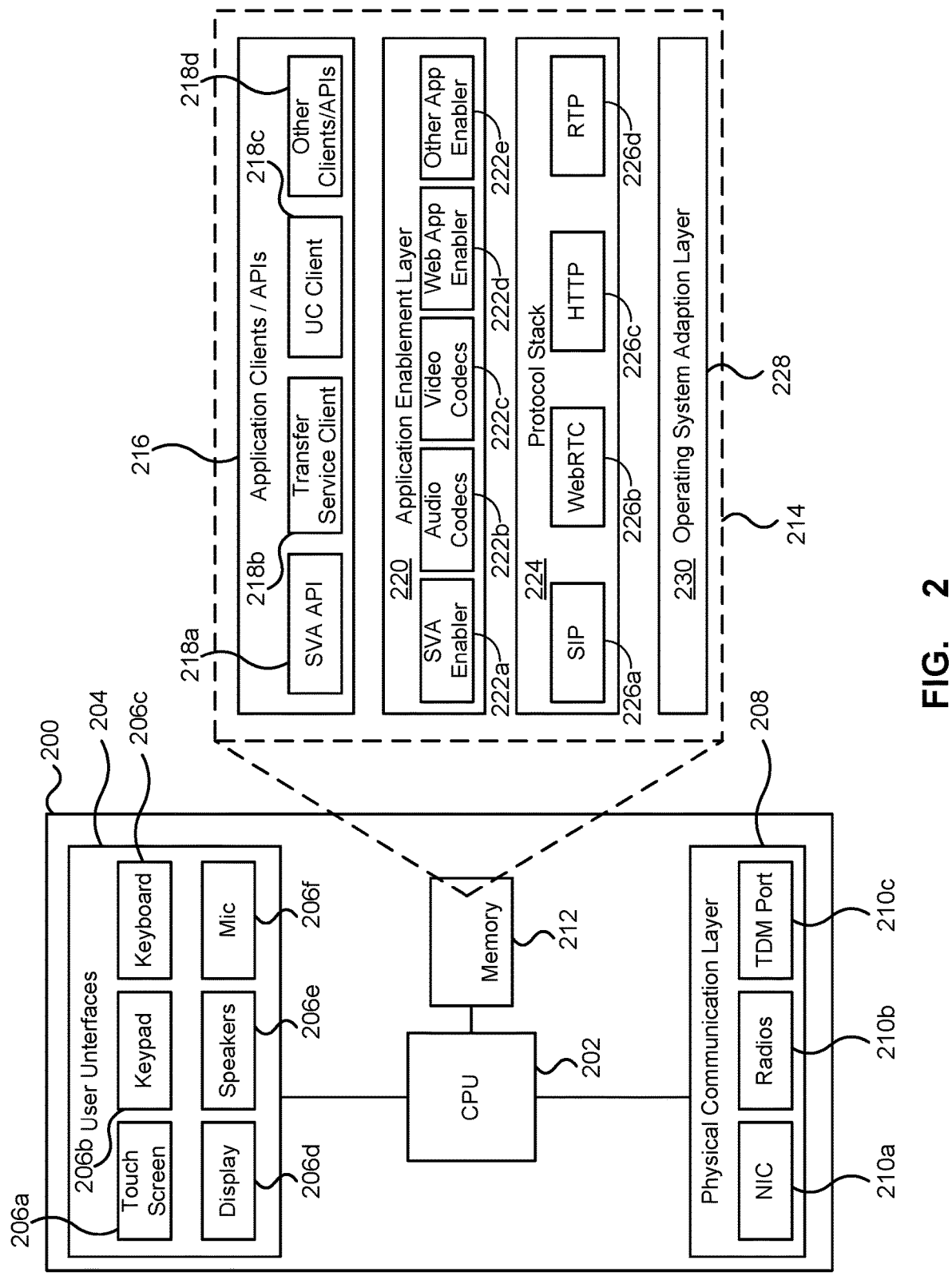
FIG. 2 depicts components of an endpoint.

FIG. 2 depicts components of an endpoint. The client architecture depicted in FIG. 2 may be used for various endpoints. Each endpoint 200 may comprise a one or more processing units 202 along with one or more user interfaces 204 such as touch screens 206*a*, keypads 206*b*, keyboards 206*c*, display screens 206*d*, speakers 206*e*, microphones 206*f*, cameras, etc. The endpoints 200 may further comprise a physical communication layer 208 that provides one or more physical interfaces such as a network interface card (NIC) 210*a*, wireless radios 210*b*, and a TDM port 210*c*. The endpoints include a memory 212 storing instructions, which when executed by the processor 202 configure the endpoint to provide one or more software components 214.

The software components 214 may include, for example application clients and Application Programming Interfaces (APIs) 216. These may include for example, a smart virtual assistant (SVA) API 218*a* that provides an interface to smart virtual assistant functionality, transfer service client 218*b* providing client side functionality for transferring communication sessions between end points, unified communication (UC) client functionality 218*c*, as well other functionality 218*d* such as dialers as well as other possible applications.

The transfer service client 218*b* may be pre-loaded with the endpoint, or may be provided via network push, or user self-download & installed. The transfer service client communicates with the transfer service communicator in the service provider's network. The transfer service client 218*b* may respond to action requests, initiate a transfer request, as well selecting a desired TTE from the available TTE endpoint pool. The TTE selection may be based on specified user preferences, such as proximity/location, capability, cost, etc. by comparing the user's preferences to the capabilities of endpoints provided in a list of available private TTE endpoints and public TTE endpoints within the user's vicinity or within a particular area. The TTE endpoints may be presented to the user in a ranked order for best possible user experience, based on user preferences, or in other orders. The transfer service client can be either a stand-alone client, or integrated with the UC Client 218*c*, although it is depicted in FIG. 2 as a stand-alone client.

The client may include other functionality including an application enablement layer 220 that provides enabling functionality to one or more of the application clients/APIs 216. The enabling functionality may include a smart virtual assistant enabler 222*a*, audio/video codecs 222*b*/222*c*, a web application enabler 222*d*, as well as other application enablers 222*e*. The smart virtual assistant enabler may provide, for example, speech recognition and speech-to-text and text-to-speech conversion. The client may include other supporting functionality including communication protocols, operating system functionality.

The client may include additional software components including, for example a protocol stack 224 that may provide one or more communication protocols. These may include for example a SIP stack 226*a*, a WebRTC stack 226*b*, an HTTP/HTTPs stack 226*c*, an RTP stack 226*d*. Additional protocols may be provided that are not depicted in FIG. 2. Further, the client may include an operating system adaptation layer 230 providing the supporting functionality to the other components described above.

Figure 3:
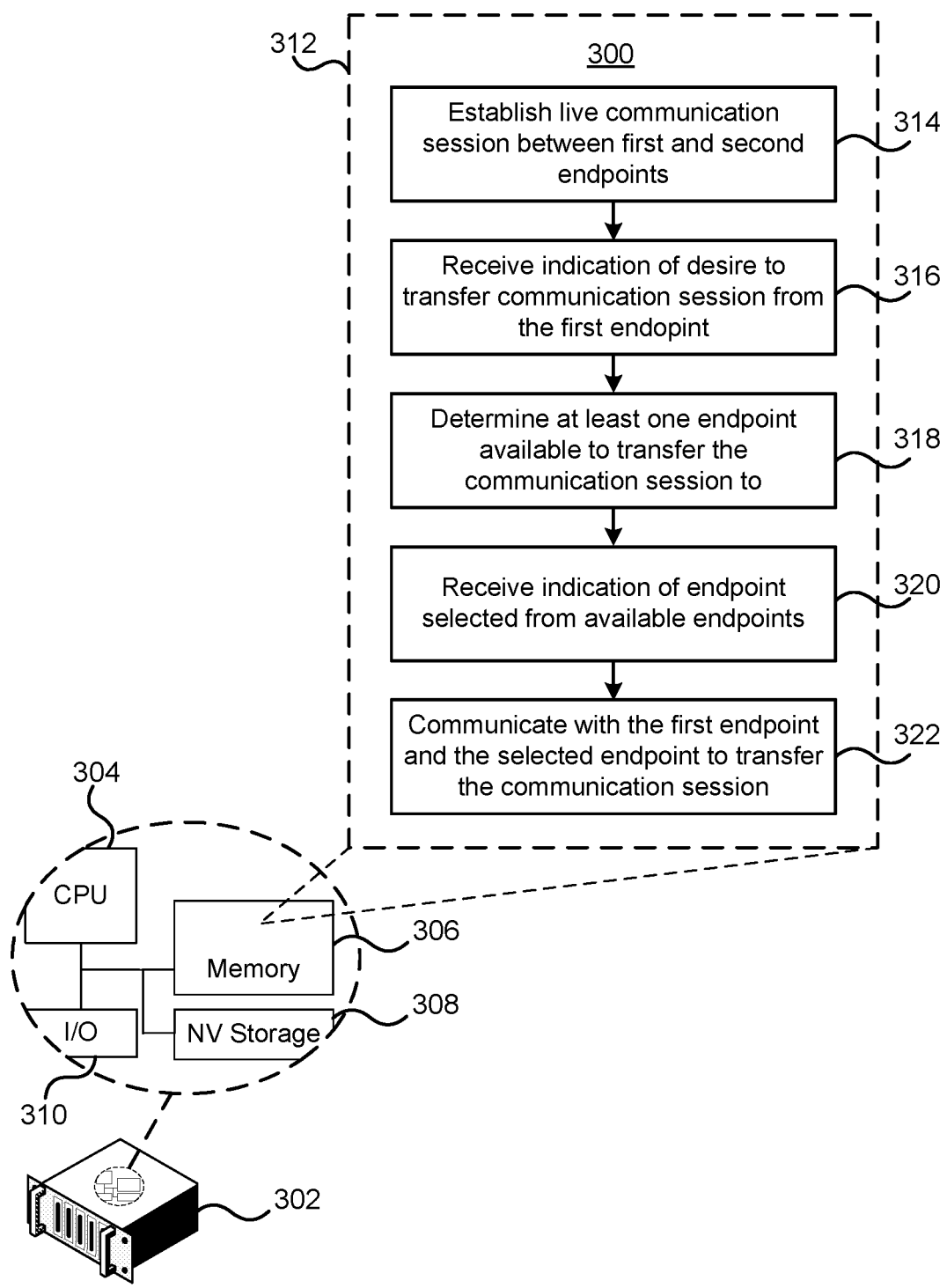
FIG. 3 depicts a method for transferring communication sessions between endpoints.

FIG. 3 depicts a method for transferring communication sessions between endpoints. The method 300 may be implemented on one or more server computers 302, comprising one or more processors 304, and memory 306 storing instructions which when executed configure the one or more server computers to carry out the method. The server computers 302 may also comprise non-volatile (NV) storage 308 as well as one or more input/output interfaces 310. The method 300 establishes a live communication session between two endpoints (314). The communication session may include audio/video, screen sharing, SMS, etc. While the communication session is in progress, an indication is received of a user's desire to transfer the communication from the current endpoint (316). The transfer may be for an immediate transfer or may be scheduled to occur at a pre-set time, or when a user arrives at a location, or both. The endpoints available to transfer the endpoint to are determined (318). The available endpoints may be associated with the user or may be publicly accessible endpoints. The endpoints may be determined from the endpoint database and possibly the presence and availability server in order to validate if possible endpoints are available for use at the particular time needed. The available endpoints may be filtered based on locations of the endpoints and user. One or more of the available endpoints may be presented to the user and an indication of a selected one of the available endpoints is received (320). After receiving the indication of the selected endpoint, the communication session is transferred from the first endpoint to the selected endpoint (322).

Figure 4:
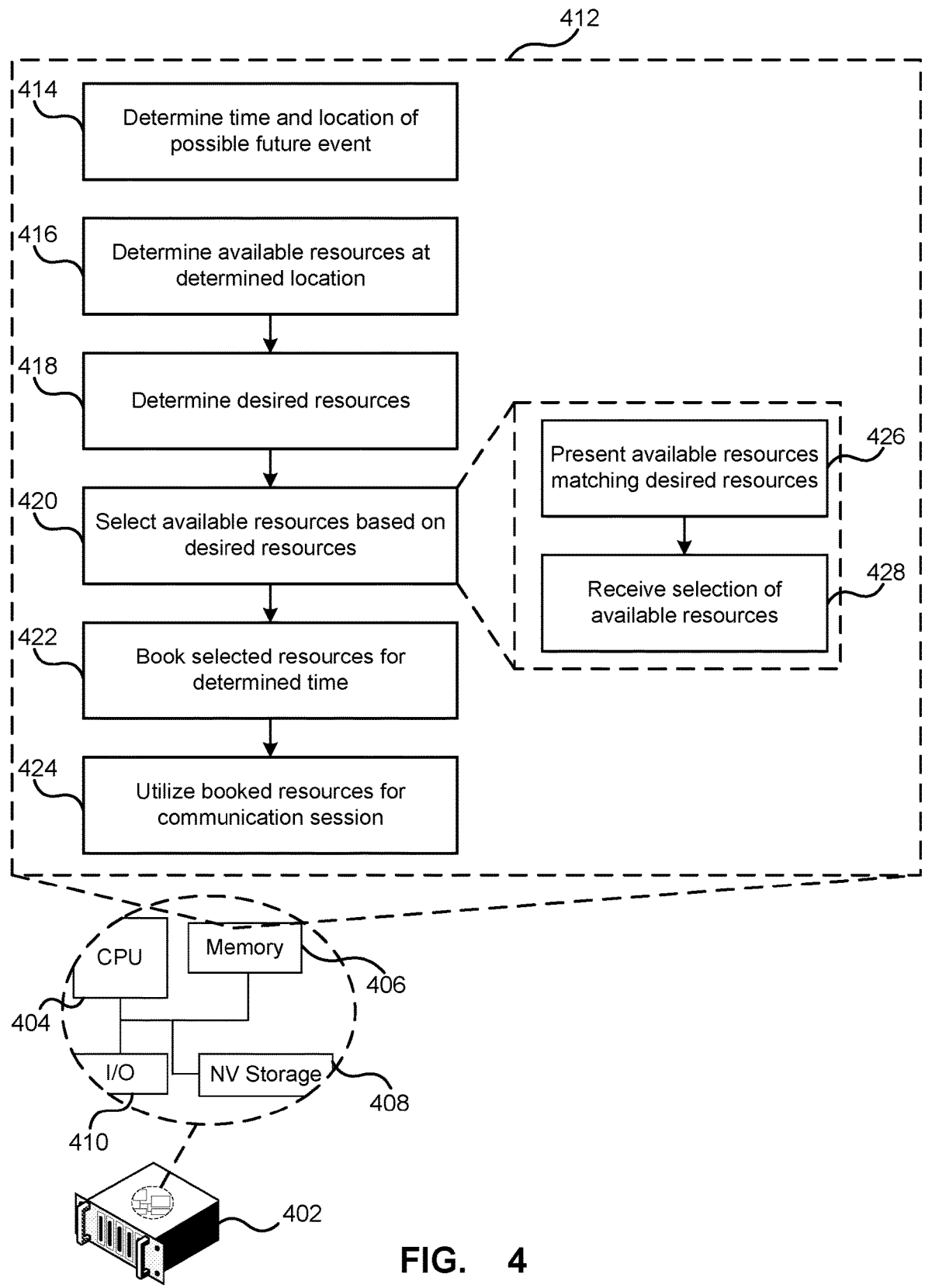
FIG. 4 depicts a method of booking and utilizing available resources for a communication session.

FIG. 4 depicts a method of booking and utilizing available resources for a communication session. The method 400 may be implemented on one or more server computers 402, comprising one or more processors 404, and memory 406 storing instructions which when executed configure the one or more server computers to carry out the method. The server computers 402 may also comprise non-volatile (NV) storage 408 as well as one or more input/output interfaces 410. The method 400 may be initiated by the user interacting with the transfer service functionality, possibly using a smart voice assistant, and providing an indication of a desire to utilize some communication resources, such as endpoints, at some time and location. Alternatively, the method 400 may be initiated by the user's endpoint determining that resources should be booked. For example, the user's endpoint device may determine that the user has teleconference scheduled at a time during which the user is travelling to work, and may attempt to book resources at work for when the user arrives. The method 400 determines a time and location of a possible future event (414). The future event may be the user arriving or being at a particular location or may be events such as meetings, etc. The determination of the time and/or location may be from explicit information provided by a user, such as the time and location of the future event, or may be determined based on other information, such as a user's calendar, previous behaviour, bookings of the user, etc. Once the time and location of the future event are determined, the resources available at the determined location may be determined (416). The determination of the available resources may be done using the endpoint database to determine the resources at the location and then using the presence and availability server to determine if the particular resources at the location are available at the determined time. Once the available resources are determined, the desired resources are determined (418), which may be done based on user preferences, characteristics of scheduled meetings or existing communication sessions. The desired resources may specify the particular characteristics of the communication session, such as using voice or video, screen sharing, etc. Once the desired resources are determined, one or more of the available resources are selected based on the desired resources (420). Once the available resources have been selected they can be booked for the determined time (422) to ensure that the resources are available for use by the user. When the user is at the determined location at the particular time, the booked resources may be used (424), either to establish a communication session, or to transfer a communication session from the user's endpoint device.

Selecting the available resources based on the desired resources may be done automatically based on the available resources. For example if there is only a single resource available, it can be automatically selected. Further, if there are multiple resources available, user preferences may be used to determine which one of the resources should be selected. If the available resources cannot be selected automatically, or if user confirmation is desired, one or more resources may be presented to the user (426). The resources presented may be determined based on the desired resources and/or user preferences. The user may then determine which of the presented resources they wish to use and the user's selection of the available resources is received (428).

Figure 5:
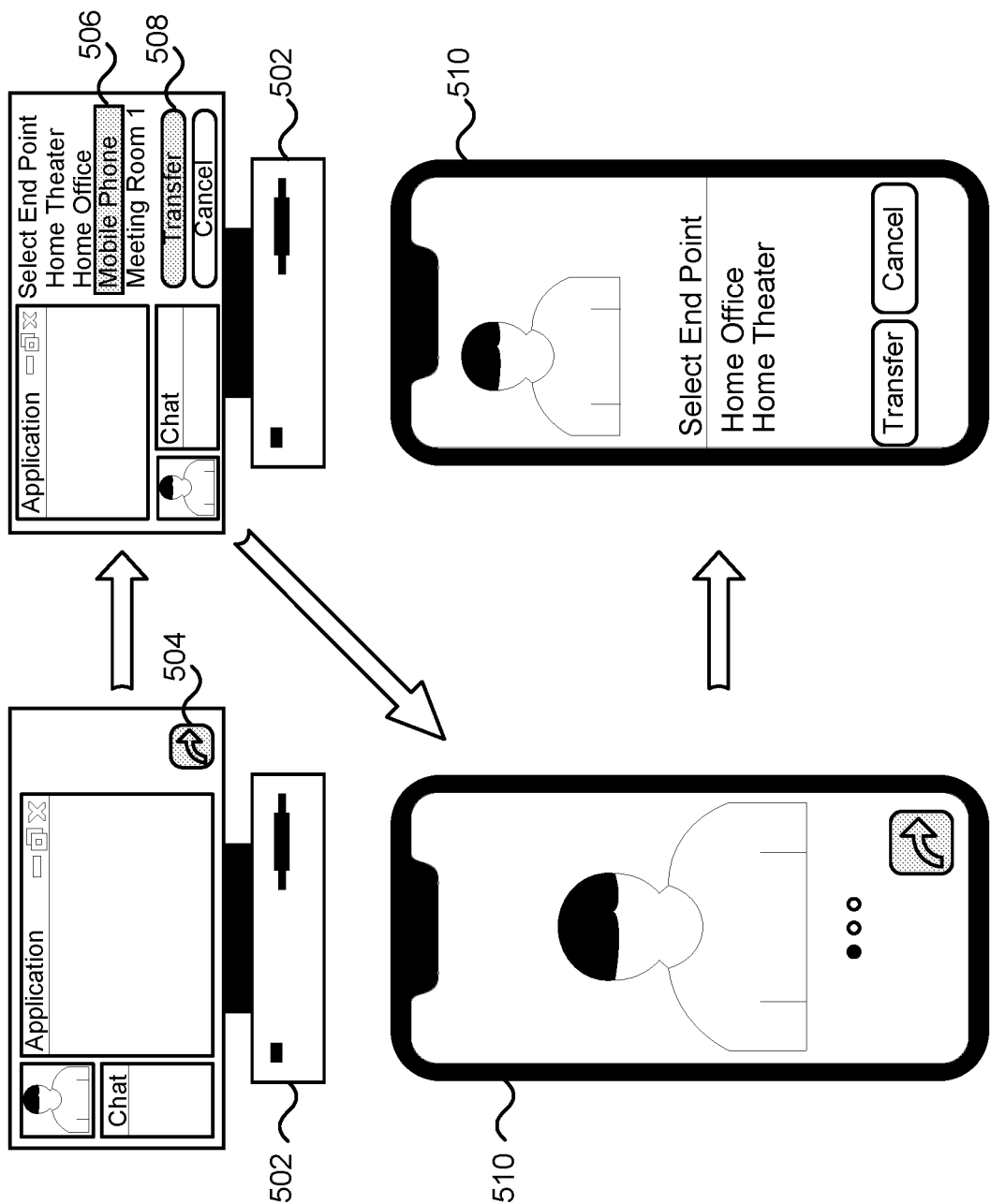
FIG. 5 depicts a user experience when transferring communication sessions between endpoints.

FIG. 5 depicts a user experience when transferring communication sessions between endpoints. As depicted, a user may establish a communication session from a first endpoint 502. The communication session may include audio/video, chat, screen sharing, etc. The user may interact with a user interface to provide an indication of a desire to transfer the communication session to another endpoint. The user interface element is depicted as a button 504, however other interactions including gestures, voice etc. are possible. Upon receiving the indication of the desire to transfer the communication session, the user may be presented with one or more available endpoints 506. Once the desired endpoint is selected, the user may interact with a user interface element 508, again depicted as a button although other interactions are possible, to transfer the communication session to the selected endpoint. As depicted the communication session is then transferred to the selected endpoint, which in the example of FIG. 5 is a mobile device 510. Different endpoints will have different capabilities, including display size, hardware resources, etc. that may cause different user experiences.

Assuming that the user has transferred the communication session from a work computer to their mobile phone while travelling home, the user may again decide to transfer the communication session to another device. Assuming the user is at home, the available devices may include for example a compatible home theatre as well as a home office.

Figure 12:
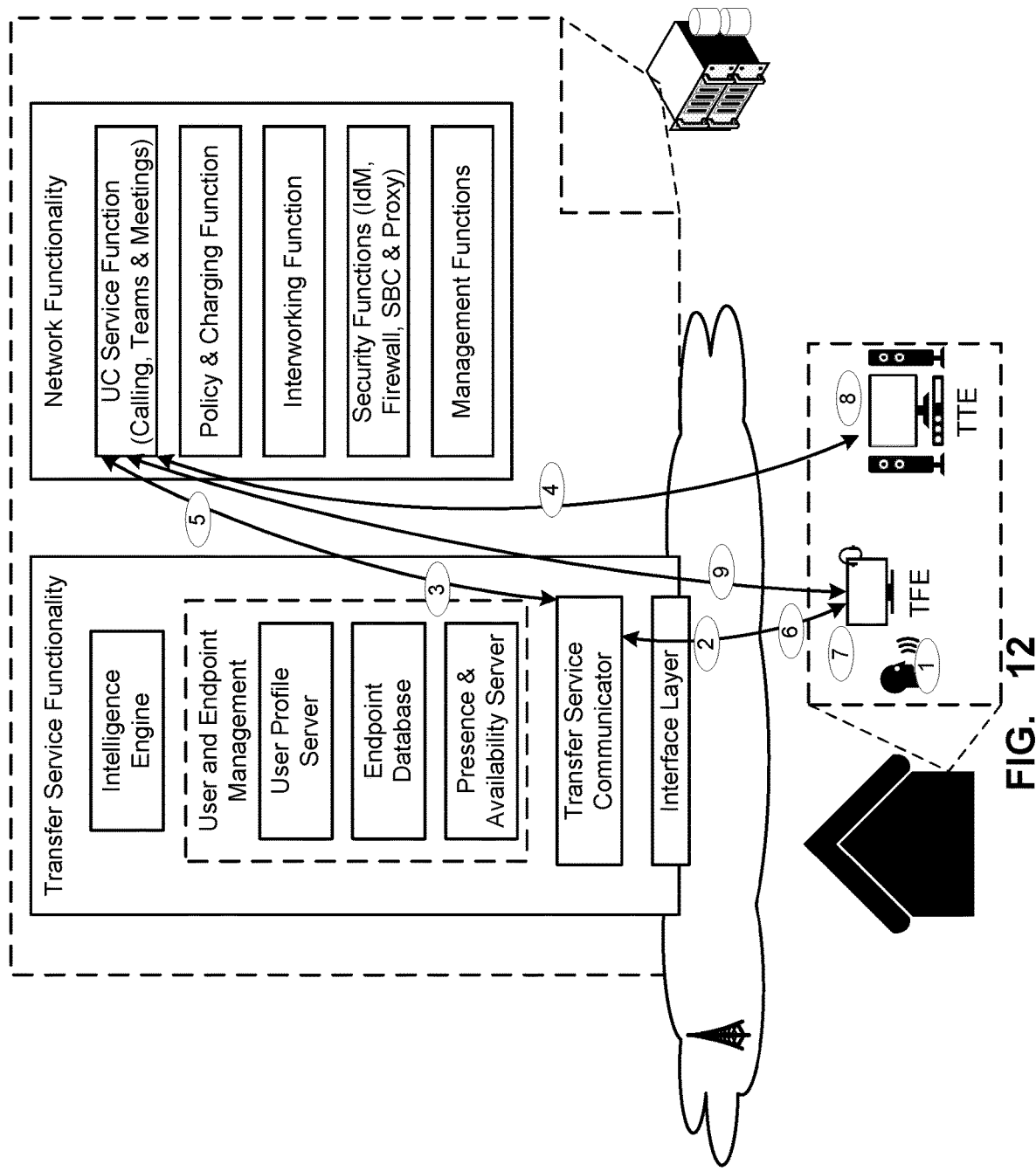
FIG. 12 depicts a further example process of transferring a communication session between endpoints.
Figure 13:
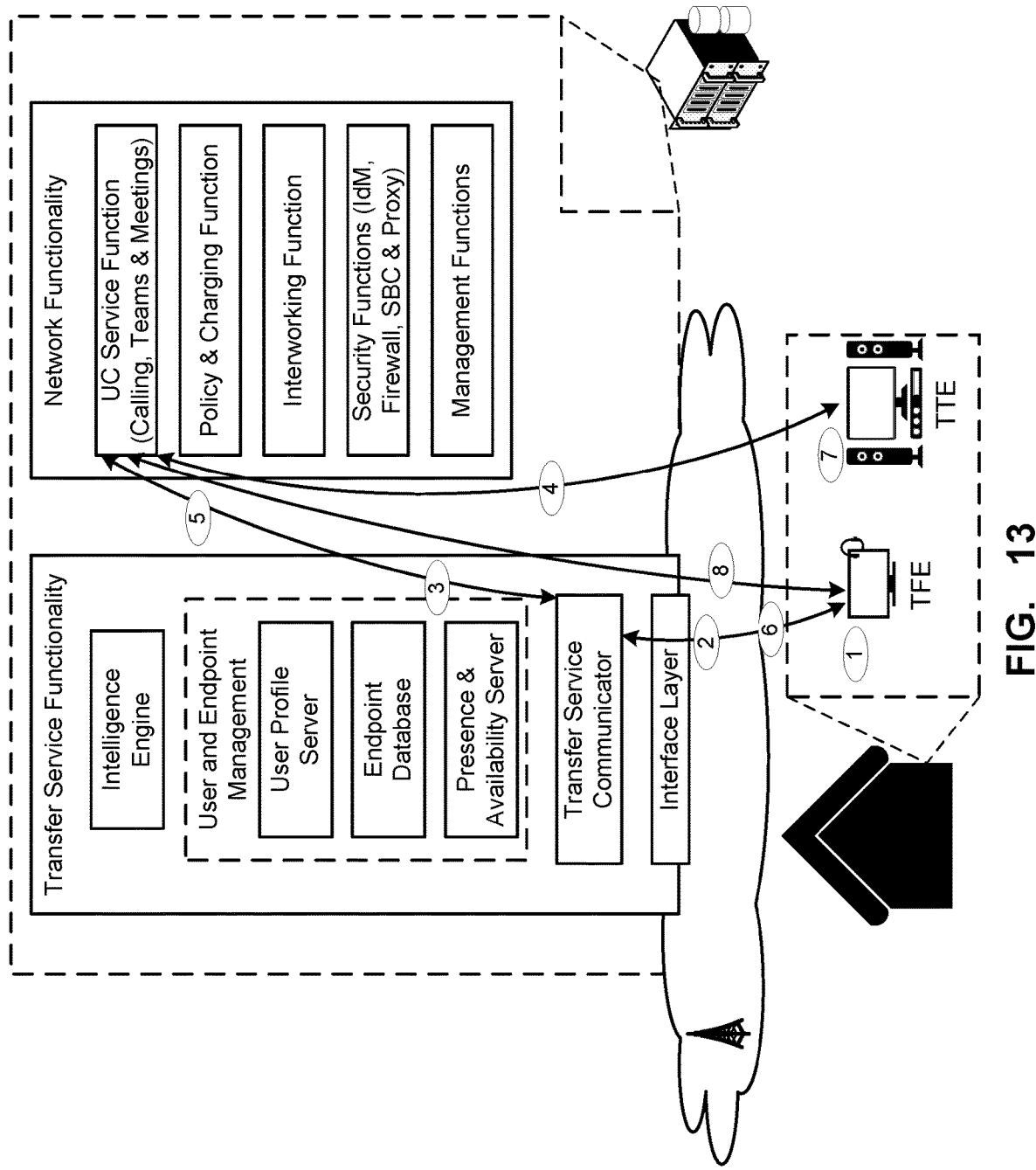
FIG. 13 depicts a further example process of transferring a communication session between endpoints.

The communication session transfer system is described further below with reference to various use cases. A first use case, described with reference to FIGS. 6-11 depicts an in office use case and shows booking a meeting room & inviting attendees, and transferring the live multimedia collaboration session between desktop, mobile & meeting room video endpoint both with a smart virtual assistant and without a smart virtual assistant. The second use case described with reference to FIGS. 12 and 13 depicts a multimedia collaboration session transfer between mobile and a home entertainment system both with and without a smart virtual assistant. The third use case, described with reference to FIG. 14, depicts a multimedia collaboration session transfer between mobile and an in-vehicle infotainment system using a smart virtual assistant. In FIGS. 6-14 the reference numbers of components described above with reference to FIG. 1 have been omitted for clarity of the figures.

Use Case 1

The first use case highlights how a user can move a live multimedia collaboration session seamlessly between a desktop, mobile device and meeting room. The following is assumed in the use case. A user John is hosting a multi-site, multi-party, multimedia collaboration session on the desktop PC in his office. Half a way through, John decides to invite his on-site team members to join him in a meeting room. John needs to book a proper meeting room on fly. John wants the session to continue while he walks over to the meeting room. John moves the session to his mobile phone first. When he arrives at the meeting room, he will then move the session to the video endpoint there. John wants a seamless process as he moves his live session from desktop to mobile and then to meeting room.

Figure 6:
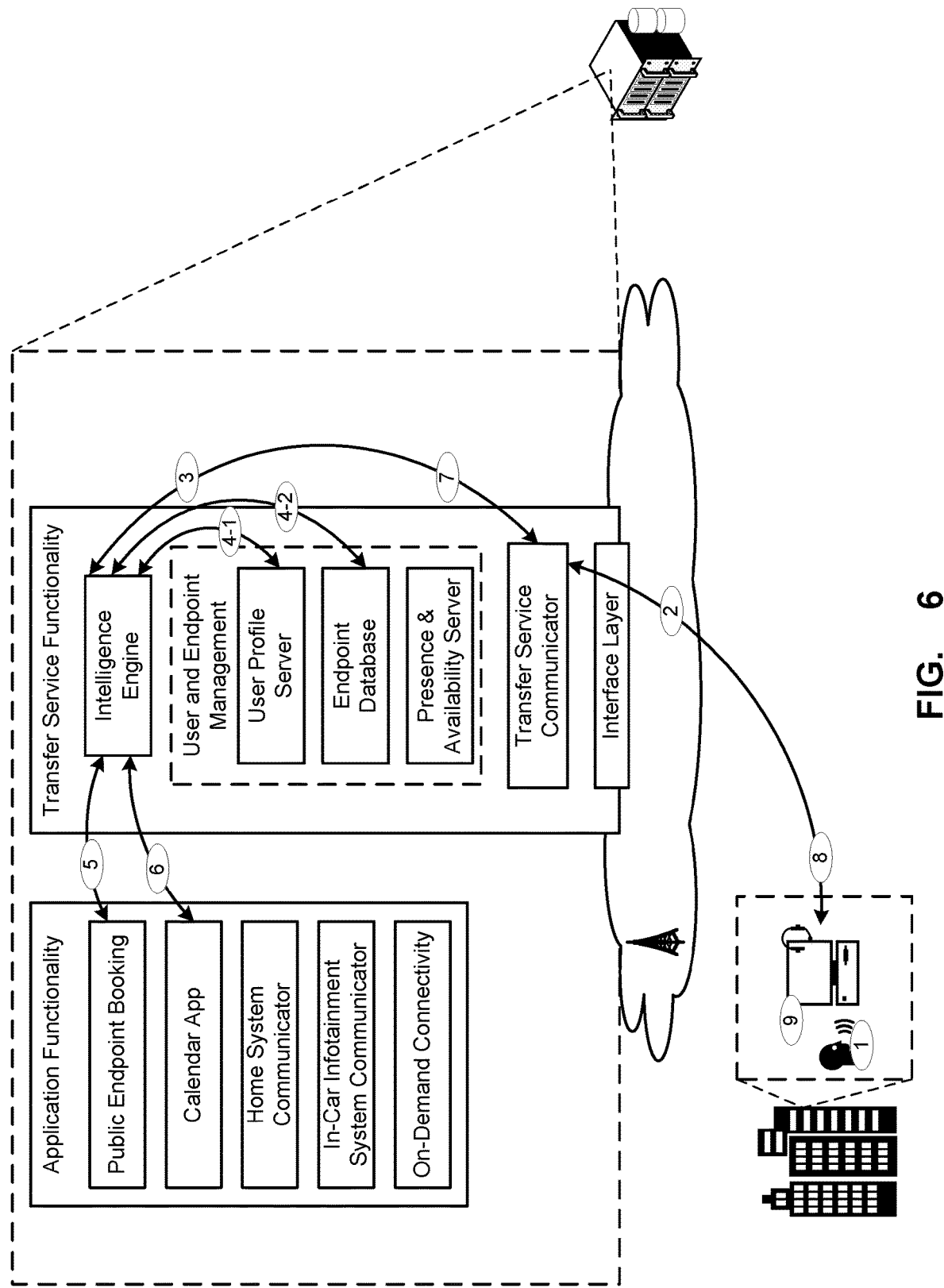
FIG. 6 depicts an example process of transferring a communication session between endpoints.

FIG. 6 depicts booking a meeting room & inviting attendees through Smart Virtual Assistant (SVA). As depicted, at step (1), John Talks to his SVA, for example called Lisa: "Lisa, can you book me a multimedia collaboration meeting room for one hour, starting in 15 minutes. Please invite everyone in my team, and put Eric, Linda and Mark as the mandatory attendees." The SVA Enabler on TFE Client receives and understands John's request via speech recognition. Lisa acknowledges John's request: "Sure, John. Let me work on it." Alternatively, John may choose to send Lisa a text message, or other communication, with the same or similar content. Lisa may acknowledge via text. Next at step (2), the client via the SVA API sends John's request to TSC. At step (3), the TSC communicates with the IE to invoke intelligent analysis and execution of the request. At step 4, the IE breaks the request into a set of specific tasks. At step (4-1), the IE queries the UP for John's office location (Site A, Floor 3) and who are in John's team (via Corporate Directory). At step (4-2), the IE queries EDB to get a list of available multimedia collaboration meeting rooms at Site A and on Floor 3. At step (5), IE pings the Meeting Booking app to book Room A3-2. At step (6), the IE puts the invite on everyone's calendar in John's team, with the meeting details, plus specifying Eric, Linda & Mark to be mandatory & others to be optional. At step (7), the IE informs TSC of the confirmed booking of Room A3-2. At step (8), the TSC passes on this information to the SVA Enabler of TFE via the SVA API. At step (9), Lisa talks to John: "John, Room A3-2 was booked, per your request. And, your team was invited. The room door code is 5-3-4-1." Alternatively, as Lisa knows John is still on the live meeting, Lisa sends a text message to John's mobile phone with the same content.

Figure 7:
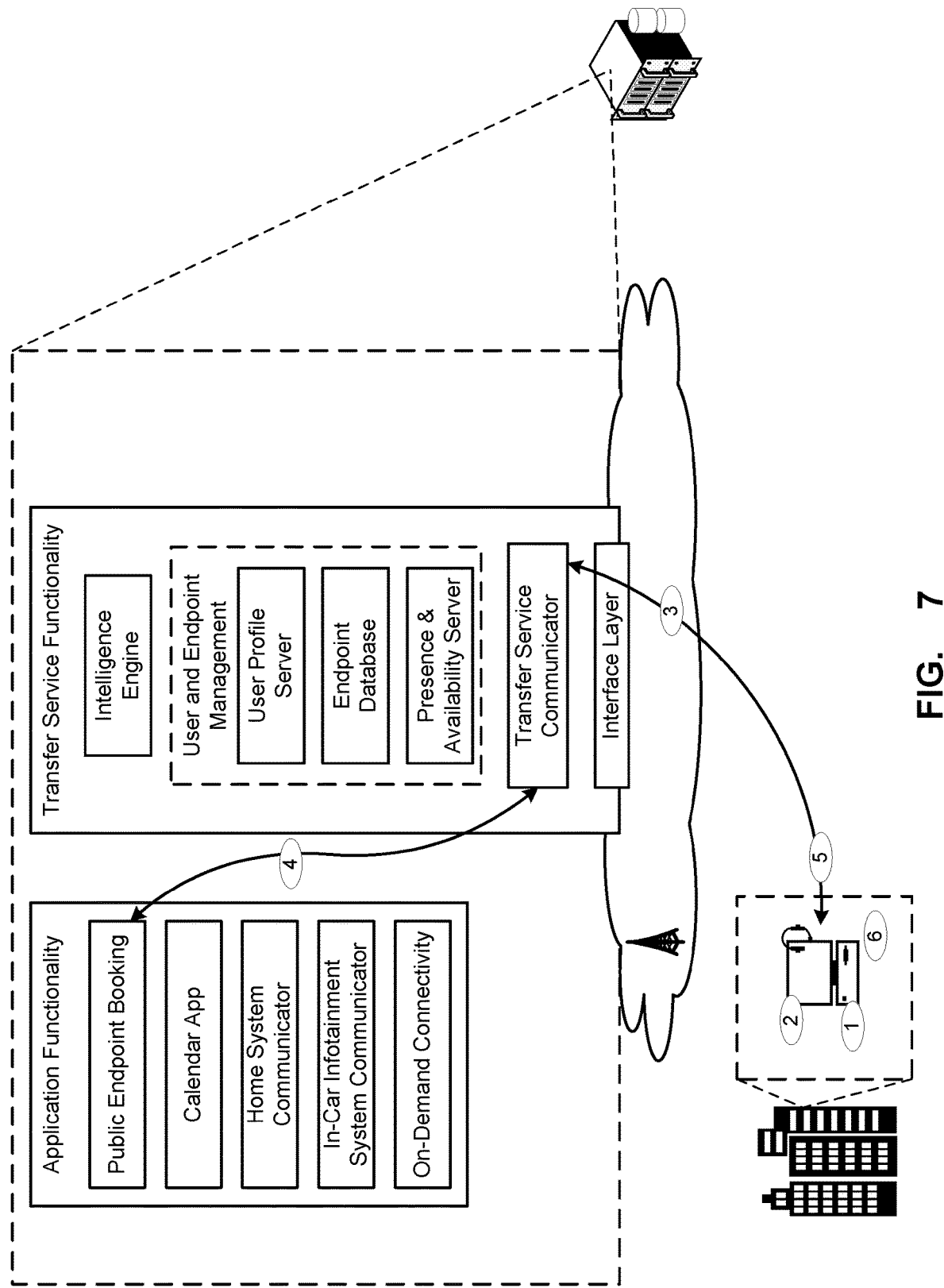
FIG. 7 depicts a further example process of transferring a communication session between endpoints.

FIG. 7 depicts booking a meeting room & inviting attendees without SVA. At step (1), John opens up the Transfer Service Client. The TTE endpoint table contains all the available endpoints (private and public). At step (2), John scans the endpoint list and finds Room A3-2 (a multimedia collaboration meeting room on the same floor at the same site) is available. At step (3), the request for Room A3-2 is sent from the TFE to TSC for this specific TTE to be added to the on-going meeting (identified by the unique meeting ID). At step (4), the TSC forwards the request to the Public Endpoint Booking app. Room A3-2 is formally booked. If there is a charge for using the meeting room, proper charge will be made in John's account through PCF. A confirmation is sent back to TSC. At step (5), the TSC forwards the confirmation to the Client. John sees the confirmation. At step (6), in his team collaboration window of UC Client, John sends a group chat message to inform his team of this session. In parallel, the meeting invite appears on the team calendar and every attendee's calendar, through the integrated Calendar app.

Figure 8:
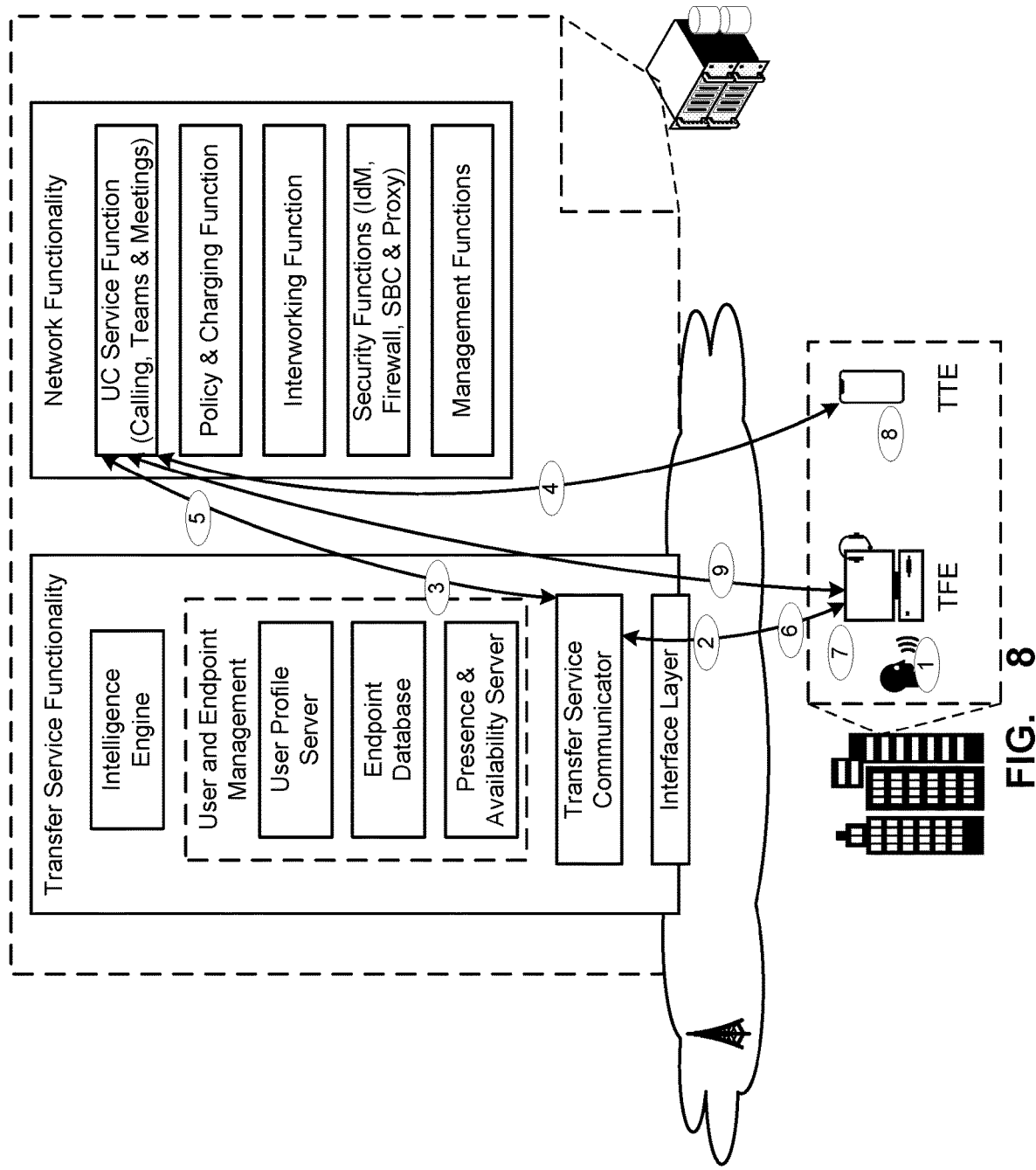
FIG. 8 depicts a further example process of transferring a communication session between endpoints.

FIG. 8 depicts moving a live session from desktop to mobile through SVA. At step (1), Lisa asks John: "John, do you want me to move your session to your mobile phone?" John replies: "Yes, please." Or, John may make the transfer request by talking to Lisa. Alternatively, this can be done through a text chat between Lisa and John, if John specifies that he prefers text messages when he is at meetings. At step (2), the client sends the transfer request to TSC: TFE=John's desktop PC; TTE=John's mobile phone. Session ID=John's live meeting (with a unique session ID). At step (3), the TSC passes on this request to UCSF via TSP. At step (4), the meeting sub-function of UCSF authenticates the TTE through TSC against John's subscription to the Transfer Service and auto-connects the TTE by sending the TTE a one-click-to-join invite message. At step (5), in parallel, UCSF notifies TSC that John's mobile phone is being added to the session. At step (6), the TSC passes the notification onto the Client. At step (7), the SVA (Lisa) on the Client will notify John: "John, your session has been transferred to your mobile phone. Please rejoin the session there by clicking the invite message." Or, if John prefers text notification when he is at meetings (as he specifies as such in his user profile), Lisa will send John a text message with the same content. At step (8), John clicks the received invite on his mobile phone and continues his session. At step (9), once John re-joins the session on his mobile phone, UCSF will close off the session on John's desktop PC (TFE). Subsequently, status of John's laptop and mobile phone will be updated in PAS and EDB, showing that his mobile phone is in use and his desktop PC is idle.

Figure 9:
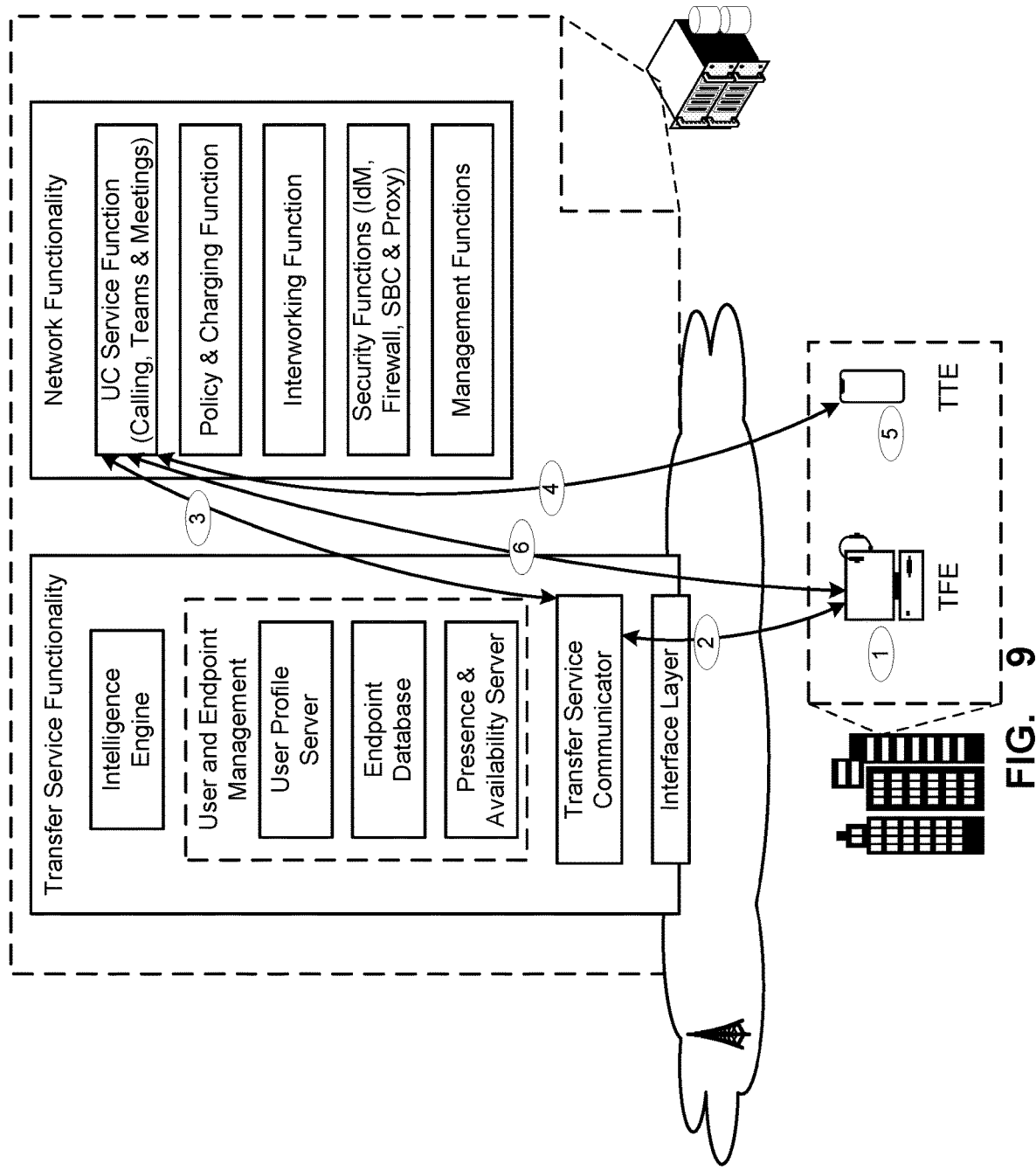
FIG. 9 depicts a further example process of transferring a communication session between endpoints.

FIG. 9 depicts moving a live session from desktop to mobile without SVA. At step (1), John selects his Mobile Phone at the TTE endpoint table as the TTE & initiates the session transfer request: TFE=John's Desktop PC; TTE=John's Mobile Phone; Session ID=John's Live Meeting. At step (2), the request is sent to TSC for John's mobile phone to be added to his on-going live meeting. At step (3), the TSC passes on this request to UCSF. At step (4), the Meeting sub-function of UCSF authenticates his mobile phone (TTE) through TSC against John's subscription to the Transfer Service. When authenticated, the Meeting sub-function auto-connects John's mobile phone by sending a one-click-to-join invite message to his mobile phone. At step (5), John clicks the received invite on his mobile phone and continues his session there. At step (6), once John re-joins the session on his mobile phone, UCSF will close off the session on John's PC (TFE). Subsequently, status of John's PC and mobile phone will be updated in PAS and EDB, showing that his mobile phone is in use and his PC is idle.

Figure 10:
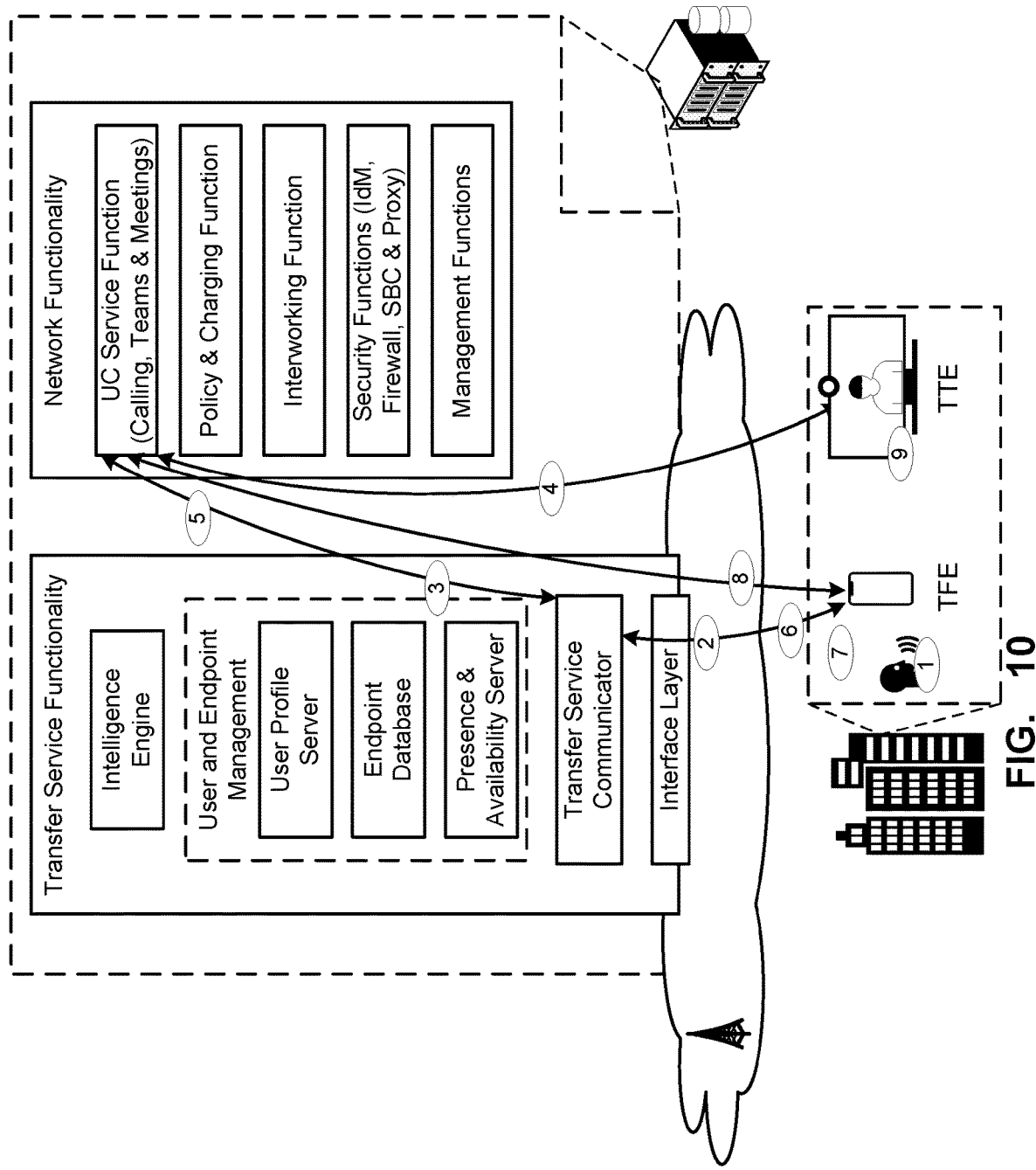
FIG. 10 depicts a further example process of transferring a communication session between endpoints.

FIG. 10 depicts moving a live session from mobile to meeting room through SVA. At step (1), Lisa asks John: "John, if you're in Room A3-2 now, I'll move your meeting there. Okay?" John replies: "Yes, please." Or, John may initiate the request by talking to Lisa. Alternatively, this can be done through a text chat between Lisa and John, if John specifies such preference in UP. At step (2), the client sends the transfer request to TSC: TFE=John's Mobile Phone; TTE=Room A3-2 Video Endpoint; Session ID=John's Live Meeting. At step (3), the TSC passes on this request to UCSF. At step (4), the Meeting sub-function of UCSF authenticates Room A3-2 Video Endpoint (TTE) through TSC against John's subscription to the Transfer Service. If successful, UCSF will auto-connect Room A3-2. A "Join" button on video board screen will light up, or an equivalent message will appear on the screen of Room Video Endpoint. At step (5), in parallel, UCSF notifies TSC that Room A3-2 is being added to John's meeting. At step (6), the TSC passes the notification onto the Client. At step (7), the SVA (Lisa) on the Client will notify John: "John, please push the "Join" button on the video board and rejoin the meeting." Or, if John prefers text notification when he is at meetings, Lisa will send John a text message to his mobile phone with the same content. At step (8), John pushes the "Join" button on Video Endpoint at Room A3-2 and continues his meeting. At step (9), once John re-joins the meeting in Room A3-2, UCSF will close off the meeting on John's Mobile Phone. Subsequently, status of John's mobile phone and Room A3-2 will be updated in PAS and EDB, showing that Room A3-2 is in use and his mobile phone is idle.

Figure 11:
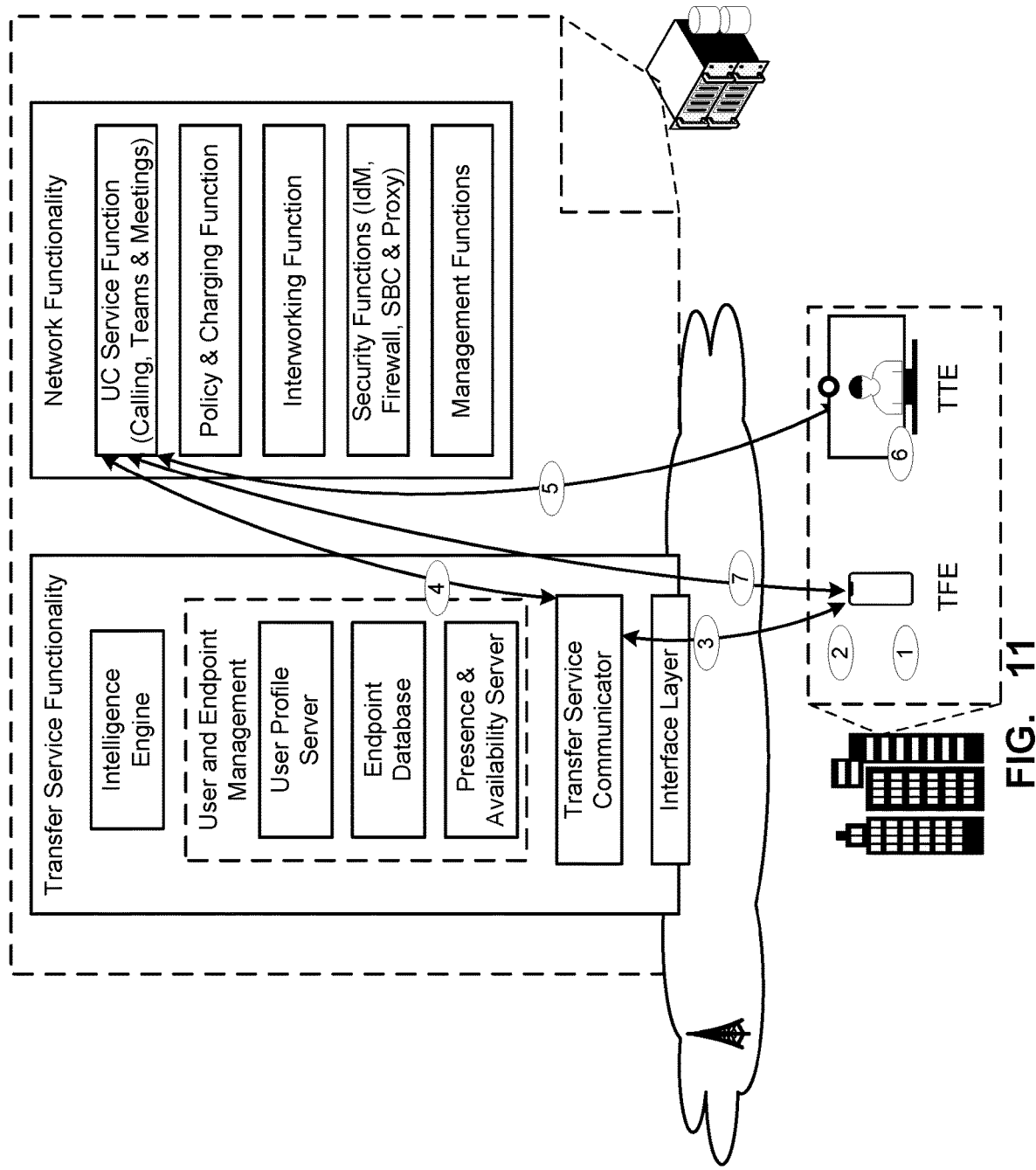
FIG. 11 depicts a further example process of transferring a communication session between endpoints.

FIG. 11 depicts moving a live session from mobile to meeting room without SVA. John (the User) walks towards Meeting Room A3-2, while continuing to host his session on his mobile phone. John and his team arrive at Room A3-2 almost at the same time. John opens A3-2 door with the assigned door code. When inside the room, John opens up the Session Transfer Client and transfers the session from his mobile phone to the video endpoint at A3-2. At step (1), when inside Room A3-2, John opens up the Session Transfer Client and notices there is already a message there waiting for him from TSC: "Click this message if you are inside Room A3-2 and want to join the session there." At step (2), John clicks that message. At step (3), that click essentially sends a session transfer request to TSC: TFE=John's Mobile Phone; TTE=Room A3-2 Video Endpoint; Session ID=John's Live Meeting. At step (4), TSC passes on this request to UCSF. At step (5), the Meeting sub-function of UCSF authenticates the TTE through TSC against John's subscription to the Transfer Service and auto-connects the TTE (Video Endpoint in Room A3-2) by sending the TTE a one-touch-to-join invite message. At step (6), John clicks the message on TTE in Room A3-2 and continues his session. At step (7), once John re-joins the session in Room A3-2, UCSF will close off the session on John's Mobile (TFE). Subsequently, status of John's mobile phone and Room A3-2 will be updated in PAS and EDB, showing that Room A3-2 is in use and his mobile is idle.

Use Case 2

The second use case shows how a user can move a live multimedia collaboration session seamlessly between desktop, mobile and entertainment system while working at home. In the second use case, it is assumed that John (the User) is hosting a multi-site, multi-party, multimedia collaboration session on desktop PC at home. Half a way through, a colleague wants to present a marketing video clip. For best viewing experience, John decides to move the meeting from desktop PC in his study to home theater in another room with a large touchable TV screen and a high-quality sound system. John's home systems (e.g. connected home theater) have been integrated with his Service Provider's UC and Session Transfer services. John's connected home theater is already on his private endpoints list under the Session Transfer Service.

FIG. 12 depicts moving the live session from desktop PC to home theater through SVA. At step (1), John asks the SVA (Lisa): "Lisa, can you move my meeting to my home theater?" Lisa replies: "Sure, John." Alternatively, this can be done through a text chat between Lisa and John, if John specifies such preference in UP. At step (2), the Transfer Service client on John's PC sends the transfer request to TSC: TFE=John's Desktop PC at home; TTE=Home Theater; Session ID=John's Live Meeting. At step (3) the TSC passes on this request to UCSF. At step (4) the Meeting sub-function of UCSF authenticates John's Home Theater (TTE) through TSC against John's subscription to the Transfer Service. If successful, UCSF will auto-connect Home Theater. A "Join" button will appears on touchable TV screen. At step (5), In parallel, UCSF notifies TSC that John's Home Theater is being added to John's meeting. At step (6), the TSC passes the notification onto the Client. At step (7), the SVA on the Client will notify John: "John, please go to your home theater, push the "Join" button on the TV screen and rejoin the meeting." Or, if John prefers text notification when he is at meetings, the SVA (Lisa) will send John a text message with the same content. At step (8), John tells other attendees to give him one minute, then walks over to his home theater, pushes the "Join" button on the TV screen and starts to watch the marketing video clip. At step (9), once John re-joins the meeting in his Home Theater, UCSF will close off the meeting on John's PC. Subsequently, status of John's PC and Home Theater will be updated in PAS and EDB, showing that his Home Theater is in use and his PC is idle.

FIG. 13 depicts moving the live session from desktop PC to home theater without SVA. At step (1), John opens up his Transfer Service Client on his PC and selects his Home Theater at the TTE endpoint table as the TTE & initiates the session transfer request: TFE=John's Desktop PC; TTE=John's Home Theater; Session ID=John's Live Meeting. At step (2), the request is sent to TSC through TSP for John's Home Theater to be added to his on-going live meeting. At step (3), the TSC passes on this request to UCSF. At step (4), the UCSF authenticates his Home Theater (TTE) through TSC against John's subscription to the Transfer Service. When authenticated, UCSF Meeting sub-function will auto-connect John's Home Theater. A "Joint" button will appear on the TV touch screen in his Home Theater. At step (5), the UCSF notifies TSC that John's Home Theater is ready. At step (6), the TSC passes on this notification to the Client and the notification appears on John's PC, based on John's notification preference. At step (7), John tells other attendees to give him one minute, then walks over to his home theater, pushes the "Join" button on the TV screen and starts to watch the marketing video clip. At step (8), once John re-joins the meeting in his Home Theater, UCSF will close off the meeting on John's PC (TFE). Subsequently, status of John's PC and Home Theater will be updated in PAS and EDB, showing that his Home Theater is in use and his PC is idle.

Use Case 3

The third use case shows how a user can move a live multimedia collaboration session seamlessly between his mobile device and in-vehicle infotainment system on the go. John (the User) is hosting a multi-site, multi-party, multimedia collaboration session on his mobile phone. He started the meeting either at home or in office, and already moved his meeting to his mobile phone. He needs to attend a customer meeting at the customer location. He needs to drive there. John has been in this dry run collaboration meeting with his team for a while, and wants to continue the dry run while he is driving to the customer site. His vehicle supports both human-driving and self-driving modes. His connected in-vehicle infotainment system has been integrated with his Service Provider's UC and Session Transfer services, and is already on his private endpoints list under the Session Transfer Service.

FIG. 14 depicts moving a live session from mobile device to in-vehicle infotainment system through smart virtual assistant. At step (1), John starts his vehicle, sets it in self-driving mode and asks Lisa (the SVA): "Lisa, can you move my meeting to my vehicle?" Lisa replies: "Sure, John." The voice request will be converted into text commands. At step (2), the Transfer Service client on John's PC sends the transfer request to TSC: TFE=John's Mobile Phone; TTE=John's Vehicle Infotainment System; Session ID=John's Live Meeting. At step (3), the TSC passes on this request to UCSF. At step (4), the UCSF authenticates John's Vehicle Infotainment System (TTE) through TSC against John's subscription to the Transfer Service. If successful, UCSF will auto-connect John's Vehicle Infotainment System. A "Join" message will appears on vehicle dashboard touch screen. At step (5), John touches the "Join" message on the touch screen and continues his dry run with his team. At step (6), once John re-joins the meeting through his vehicle infotainment system, UCSF will close off the meeting on John's mobile phone. Subsequently, status of John's mobile phone and his vehicle infotainment system will be updated in PAS and EDB, showing that his vehicle infotainment system is in use and his mobile phone is idle.

As described above, a communication session may be transferred between endpoint. The session may include one or more of a multimedia collaboration session (video, voice, web); a web collaboration session; a video conference; a voice conference; a chat & messaging session; other media session (e.g. Virtual Reality, Augmented Reality, Mixed Reality, gaming); and Other apps (e.g. email, document, other business app). The different endpoint may have different capabilities. A same-grade transfer may keep the transferred live multimedia collaboration session with the same attributes (resolution, video and voice codec, frame/data rate), when the TTE and the TFE are of the same type. An upgraded transfer may upgrade transferred live multimedia collaboration session with better attributes (higher resolution, higher-rate video and voice codec, and/or higher frame/data rate), when the TTE is better than the TFE (e.g. from mobile phone to in-room video endpoint). A downgraded transfer may downgrade transferred live multimedia collaboration session with a set of attributes at lower level (lower resolution, lower-rate video and voice codec, lower frame/data rate, or even down-graded from video to voice only, or message only). The endpoints may include one or more of private endpoints; public endpoints (available for booking); desktop & laptop computers (soft clients with headset and webcam); IP phones & video phones; office/desktop video endpoints; meeting room video endpoints; IoT-connected windows, walls, windshields; home endpoints (e.g. home theater, Smart Speaker); in-car infotainment systems; and smart goggles, smart glasses, HoloLens, or other devices for VR/AR/MR. The transfer functionality may be integrated with other functionality including, for example meeting room booking; public endpoint booking; home apps (e.g. home theater, Smart Speaker); in-vehicle infotainment apps; on-demand connectivity services; and other vertical apps.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the components and processes described herein may be provided by various combinations of software, firmware and/or hardware, other than the specific implementations described herein as illustrative examples.

The techniques of various embodiments may be implemented using software, hardware and/or a combination of software and hardware. Various embodiments are directed to apparatus, e.g. a node which may be used in a communications system or data storage system. Various embodiments are also directed to non-transitory machine, e.g., computer, readable medium, e.g., ROM, RAM, CDs, hard discs, etc., which include machine readable instructions for controlling a machine, e.g., processor to implement one, more or all of the steps of the described method or methods.

Some embodiments are directed to a computer program product comprising a computer-readable medium comprising code for causing a computer, or multiple computers, to implement various functions, steps, acts and/or operations, e.g. one or more or all of the steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the method(s) described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope.

What is claimed is:

1. A method for transferring a communication session between endpoints, the method comprising:
    establishing a communication session between a first user endpoint associated with a user and one or more communication session endpoints;
    receiving at a first time an indication of a desire to transfer the communication session from the first user endpoint comprising an indication of a desired location and a desired time in the future relative to the first time for transferring the communication session;
    upon receiving the indication of the desire to transfer the communication sessions at the first time, determining a second user endpoint that is available at the desired location and desired time in the future to transfer the communication session to from the first user endpoint;
    upon receiving the indication of the desire to transfer the communication sessions at the first time, reserving the second user endpoint at the desired location and desired time in the future; and
    transferring the communication session from the first user endpoint to the second user endpoint when the first user endpoint is at the desired location at the desired time in the future.

2. The method of claim 1, wherein determining the second user endpoint comprises:
    determining a plurality of second user endpoints that are available; and
    selecting one of the plurality of second user endpoints as the second user endpoint to transfer the communication session to.

3. The method of claim 2, wherein determining the plurality of second user endpoints comprises:
    determining available user endpoints at a location from a database of endpoints; and
    determining if the available user endpoints are available for use.

4. The method of claim 2, wherein selecting one of the plurality of second user endpoints comprises automatically selecting one of the plurality of second user endpoints based on user preferences.

5. The method of claim 2, wherein selecting one of the plurality of second user endpoints comprises:
   ordering the available user endpoints according to characteristics of the available user endpoints and user preferences;
   presenting the ordered available user endpoints; and
   receiving the selection of one of the presented available user endpoints.

6. The method of claim 1, wherein the communication session with the first user endpoint and the communication session with the second user endpoint each comprise session components comprising one or more of:
   video;
   audio;
   instant messaging;
   screen sharing; and
   file sharing.

7. The method of claim 6, wherein the communication session with the first user endpoint and the communication session with the second user endpoint comprise different session components from each other.

8. A system for transferring a communication session between endpoints, the system comprising:
   a processor for executing instructions; and
   a memory storing instructions, which when executed configure the system to:
      establish a communication session between a first user endpoint associated with a user and one or more communication session endpoints;
      receive at a first time an indication of a desire to transfer the communication session from the first user endpoint comprising an indication of a desired location and a desired time in the future relative to the first time for transferring the communication session;
      upon receiving the indication of the desire to transfer the communication sessions at the first time, determine a second user endpoint that is available at the desired location and desired time in the future to transfer the communication session to from the first user endpoint;
      upon receiving the indication of the desire to transfer the communication sessions at the first time, reserve the second user endpoint at the desired location and desired time in the future; and
      transfer the communication session from the first user endpoint to the second user endpoint when the first user endpoint is at the desired location at the desired time in the future.

9. The system of claim 8, wherein determining the second user endpoint comprises:
   determining a plurality of second user endpoints that are available; and
   selecting one of the plurality of second user endpoints as the second user endpoint to transfer the communication session to.

10. The system of claim 9, wherein determining the plurality of second user endpoints comprises:
    determining available user endpoints at a location from a database of endpoints; and
    determining if the available user endpoints are available for use.

11. The system of claim 9, wherein selecting one of the plurality of second user endpoints comprises automatically selecting one of the plurality of second user endpoints based on user preferences.

12. The system of claim 9, wherein selecting one of the plurality of second user endpoints comprises:
    ordering the available user endpoints according to characteristics of the available user endpoints and user preferences;
    presenting the ordered available user endpoints; and
    receiving the selection of one of the presented available user endpoints.

13. The system of claim 8, wherein the communication session with the first user endpoint and the communication session with the second user endpoint each comprise session components comprising one or more of:
    video;
    audio;
    instant messaging;
    screen sharing; and
    file sharing.

14. The system of claim 13, wherein the communication session with the first user endpoint and the communication session with the second user endpoint comprise different session components from each other.

* * * * *